US009773365B2

(12) United States Patent
Doi

(10) Patent No.: US 9,773,365 B2
(45) Date of Patent: Sep. 26, 2017

(54) MONEY HANDLING APPARATUS

(71) Applicant: GLORY LTD., Himeji-shi, Hyogo (JP)

(72) Inventor: Kazuhiro Doi, Hyogo (JP)

(73) Assignee: GLORY LTD., Himeji-shi, Hyogo (JP)

( * ) Notice: Subject to any disclaimer, the term of this patent is extended or adjusted under 35 U.S.C. 154(b) by 0 days.

(21) Appl. No.: 14/926,292

(22) Filed: Oct. 29, 2015

(65) Prior Publication Data

US 2016/0049035 A1    Feb. 18, 2016

Related U.S. Application Data

(63) Continuation of application No. 13/522,544, filed as application No. PCT/JP2010/051214 on Jan. 29, 2010, now Pat. No. 9,202,326.

(51) Int. Cl.
*G06Q 40/00* (2012.01)
*G07D 11/00* (2006.01)
(Continued)

(52) U.S. Cl.
CPC ....... *G07D 11/0036* (2013.01); *G06Q 20/042* (2013.01); *G07D 1/06* (2013.01);
(Continued)

(58) Field of Classification Search
CPC ............... G07D 11/00; G07D 11/0021; G07D 11/0087; G07D 11/009; G07D 11/0036;
(Continued)

(56) References Cited

U.S. PATENT DOCUMENTS 6,796,488 B1 * 9/2004 Saffarian ............ G06Q 20/042
235/379
7,467,744 B1   12/2008 Crews et al.
(Continued)

FOREIGN PATENT DOCUMENTS

DE          41 35 450 A1    4/1993
DE    10 2007 025 940 A1   12/2008
(Continued)

OTHER PUBLICATIONS

European Office Action (Application No. 10 844 597.4) (8 pages—dated Nov. 28, 2016).

*Primary Examiner* — Laura Gudorf
(74) *Attorney, Agent, or Firm* — Renner, Kenner, Greive, Bobak, Taylor & Webber

(57) ABSTRACT

A money handling apparatus that handles money includes an inlet for taking in money; a money storing unit that stores therein the money; an outlet for dispensing the money; a money transport unit that transports the money between the inlet and the outlet, and the money storing unit; a money recognition unit that is provided to the transport unit and recognizes the money; a check receiving port for receiving a check; a scanner that scans the check to acquire a check image; a check transport unit that transports the check between the check receiving port and the scanner; a check recognition unit that recognizes check information that includes at least a check amount from the check image acquired by the scanner; and a control unit that dispenses money equivalent to an amount of difference between a transaction amount acquired from outside the money handling apparatus and a sum of the check amount and an amount of the deposited money.

10 Claims, 3 Drawing Sheets

(51) Int. Cl.
  *G07F 19/00*    (2006.01)
  *G06Q 20/04*    (2012.01)
  *G07D 1/06*     (2006.01)
  *G07G 1/00*     (2006.01)

(52) U.S. Cl.
  CPC ....... *G07D 11/009* (2013.01); *G07D 11/0021* (2013.01); *G07D 11/0087* (2013.01); *G07F 19/20* (2013.01); *G07F 19/202* (2013.01); *G07G 1/0018* (2013.01)

(58) Field of Classification Search
  CPC ...... G07D 1/06; G06Q 20/18; G06Q 20/1085; G06Q 20/042; G07F 19/20; G07F 19/202; G07G 1/0018
  USPC ........................................................ 235/379
  See application file for complete search history.

(56) References Cited

U.S. PATENT DOCUMENTS

| | | | |
|---|---|---|---|
| 7,792,753 B1* | 9/2010 | Slater ................ | G06Q 20/04 705/35 |
| 2001/0037297 A1* | 11/2001 | McNair ............... | G06Q 20/102 705/40 |
| 2005/0006458 A1* | 1/2005 | Wanibe ................ | G07D 7/00 235/379 |
| 2008/0135609 A1* | 6/2008 | DCosta ............... | G06Q 20/042 235/379 |

FOREIGN PATENT DOCUMENTS

| | | | | |
|---|---|---|---|---|
| GB | 2 147 134 A | 5/1985 | | |
| WO | WO 0169495 A1 * | 9/2001 | ............. | G06Q 20/04 |

\* cited by examiner

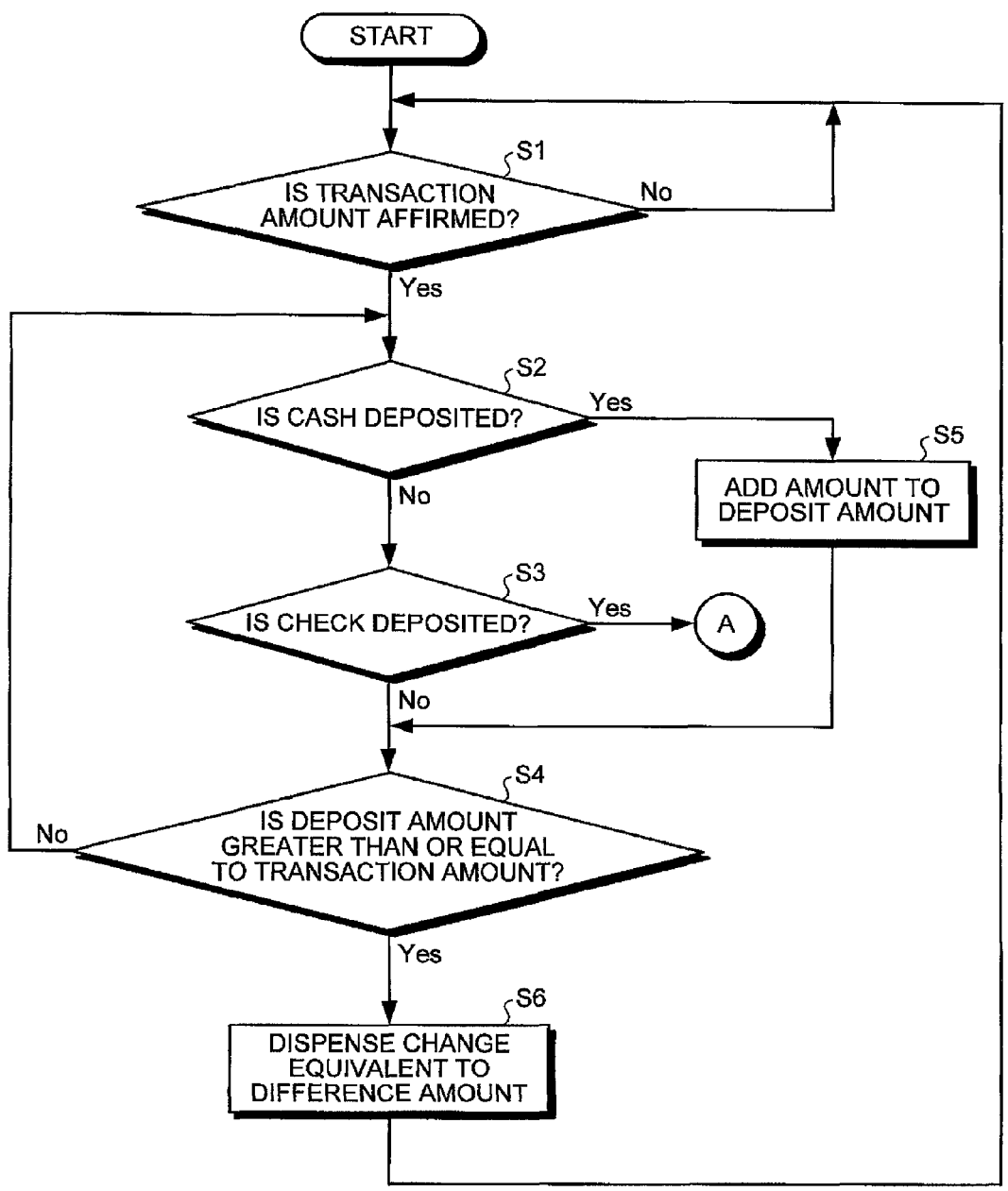

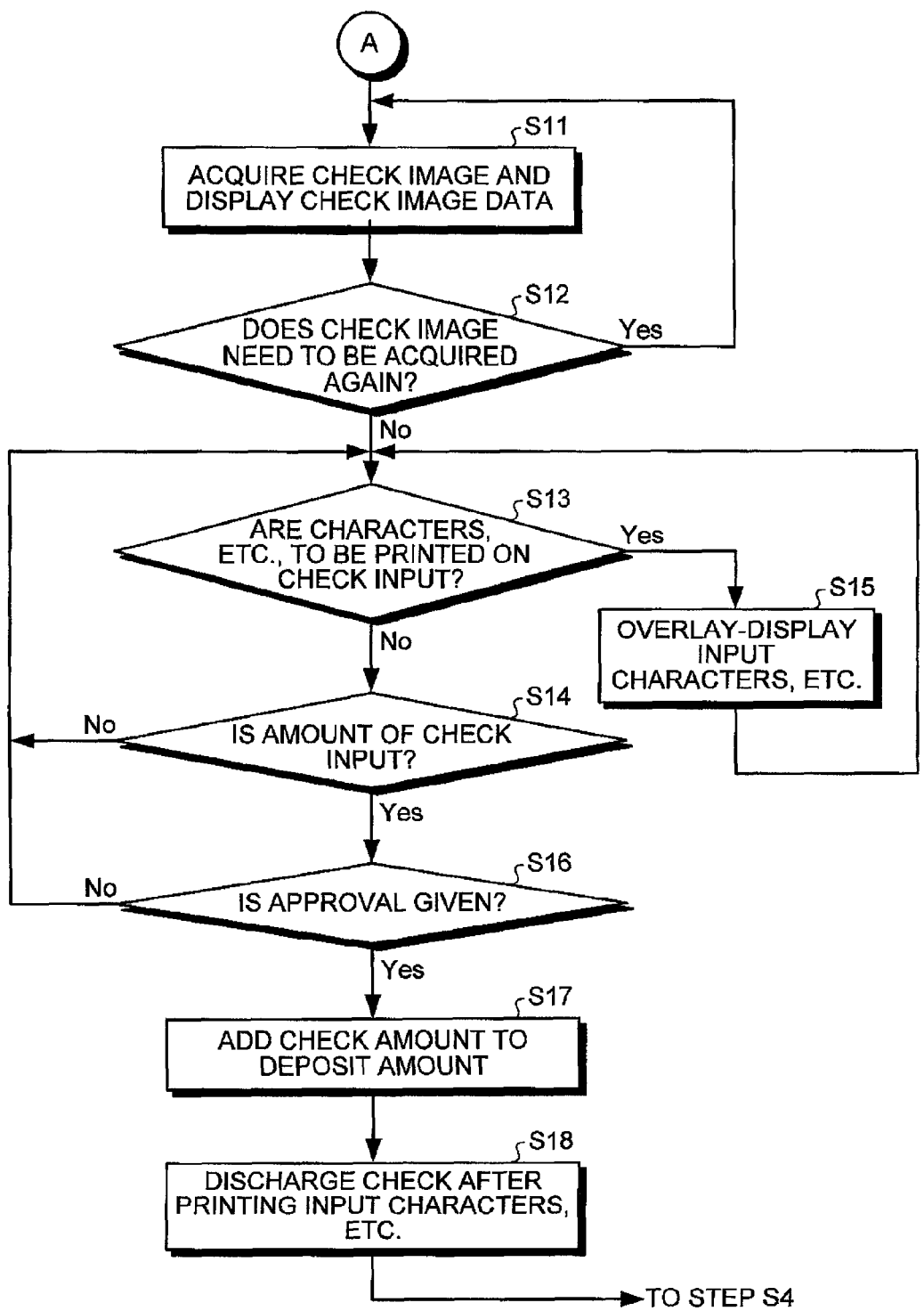

MONEY HANDLING APPARATUS

CROSS-REFERENCE TO RELATED APPLICATION

This application is a continuation of U.S. patent application Ser. No. 13/522,544 filed on Jul. 17, 2012, which is incorporated herein by reference, which was based upon and claimed the benefit of priority from the prior PCT/JP2010/051214 filed on Jan. 29, 2010 the entire contents of which are incorporated herein by reference.

TECHNICAL FIELD

The present invention relates to a money handling apparatus that dispenses change in business transactions, etc.

BACKGROUND ART

In locations, such as, retail stores, where business transaction is performed, a money handling apparatus that has, for example, a function of dispensing change automatically is used as an accounting support device aimed at supporting accounting services pertaining to transactions.

Such a money handling apparatus is connected to a cash register, and acquires a transaction amount equivalent to a purchase amount of goods, etc. from the cash register. The money handling apparatus has a function in which an amount of difference between the transaction amount and a paid cash amount paid by a customer is calculated as change and cash equivalent to the amount of difference is dispensed. When the customer pays the cash for the goods, a register operator (hereinafter, "cashier") can pay the change to the customer accurately and promptly by using the money handling apparatus.

Such a money handling apparatus comes in various forms, such as, a coin handling apparatus that handles coins, a banknote handling apparatus that handles banknotes, or an apparatus in which the coin handling apparatus and the banknote handling apparatus are integrated.

In the locations, such as, retail stores, where business transaction is performed, checks are sometimes used for the payment of goods. For example, when a customer purchases goods, the customer hands over a check on which an amount equivalent to a transaction amount, a signature and date are written. The transaction for the goods is completed after the customer hands over the check. Later on, the check received from the customer is cashed at a bank by the retail store, etc.

As a process for encashment of the check, in addition to the conventional practice of using an actual check, a new approach of using an image of the check has come into practice. Specifically, for example, in USA, a check image is recorded and encashment of the check is performed based on the check image. In this approach, a check image can be recorded at the time of a transaction, and the actual check can be immediately returned to the customer.

Technologies related to the use of a check are disclosed in, for example, Patent Documents 1 to 3. In Patent Document 1, a technology is disclosed in which a check image is acquired, and the check image is used as reference information. In Patent Documents 2 and 3, technologies are disclosed in which necessary information is recognized from an acquired check image, and based on a recognition result, judgment of authenticity of the check and an information update of the concerned bank account are performed.

CONVENTIONAL ART DOCUMENTS

Patent Documents

[Patent Document 1] Japanese Patent Application Laid-open No. H7-244702
[Patent Document 2] U.S. Pat. No. 6,603,872
[Patent Document 3] U.S. Pat. No. 6,647,136

DISCLOSURE OF INVENTION

Problem to be Solved by the Invention

In this manner, in the locations, such as, retail stores, where business transaction is performed, not only cash but checks are also used as described above. Therefore, it is desirable to install an accounting support device that supports payments by check as well as by cash.

However, a large space is required for installing accounting support devices separately for handling each of cash and checks.

When cash and checks are to be handled by separate accounting support devices, it is necessary to select and use the accounting support device according to the customer's choice of the mode of payment, that is, according to whether the transaction amount is paid by cash or by check. Thus, accounting services become cumbersome, a load on the cashier increases, and it increases the probability of errors in the accounting services.

The present invention is made in view of the above discussion and it is an object of the present invention to provide a money handling apparatus that operates as an accounting support device that supports payments by check as well as by cash.

Means to Solve the Problems

According to a first aspect of the present invention, a money handling apparatus that handles money includes an inlet for taking in money; a money storing unit that stores therein the money; an outlet for dispensing the money; a money transport unit that transports the money between the inlet and the money storing unit, and the money storing unit and the outlet; a recognition unit that recognizes the money while the money is transported by the money transport unit; a check receiving port for receiving a check; a scanner that scans the check to acquire a check image; a check transport unit that transports the check between the check receiving port and the scanner; a recognition unit that recognizes check information that includes at least a check amount from the check image acquired by the scanner; and a control unit that dispenses money equivalent to a difference amount between a transaction amount acquired from outside the money handling apparatus and a sum of the check amount and the deposited money.

According to a second aspect of the present invention, in the money handling apparatus according to the first aspect, the control unit outputs data including the check image acquired by the scanner to an external device.

According to a third aspect of the present invention, in the money handling apparatus according to the first aspect, the check whose image is acquired by the scanner is discharged from the check receiving port.

According to a fourth aspect of the present invention, the money handling apparatus according to the first aspect further includes a check discharge port that discharges the check whose image is acquired by the scanner.

According to a fifth aspect of the present invention, the money handling apparatus according to the first aspect further includes a storing unit that stores therein the check whose image is acquired by the scanner.

According to a sixth aspect of the present invention, the money handling apparatus according to the first aspect further includes a memory unit that stores therein the check image acquired by the scanner.

According to a seventh aspect of the present invention, the money handling apparatus according to the first aspect further includes a judgment unit that judges the validity of the check based on the check information recognized by the recognition unit.

According to an eighth aspect of the present invention, in the money handling apparatus according to the seventh aspect, the check information includes a signature recognized from the check image, and the judgment unit judges the validity of the signature based on the recognized signature.

According to a ninth aspect of the present invention, a money handling apparatus that handles money includes an inlet for taking in money; a money storing unit that stores therein money; an outlet for dispensing money; a money transport unit that transports the money between the inlet and the money storing unit, and the money storing unit and the outlet; a recognition unit that recognizes the money while the money is transported by the money transport unit; a check receiving port for receiving a check; a scanner that scans the check to acquire a check image; a check transport unit that transports the check between the check receiving port and the scanner; and a control unit that calculates a difference amount between a transaction amount acquired from outside the money handling apparatus and a total amount of the deposited money as a check amount.

According to a tenth aspect of the present invention, the money handling apparatus according to the ninth aspect further includes a display unit that displays the check amount.

According to an eleventh aspect of the present invention, in the money handling apparatus according to the ninth aspect, the check image acquired by the scanner is displayed and the check amount is overlay-displayed at a predetermined position on the check image.

According to a twelfth aspect of the present invention, the money handling apparatus according to the ninth aspect further includes a printer that prints the check amount at a predetermined position on the check.

According to a thirteenth aspect of the present invention, the money handling apparatus according to the ninth aspect further includes a memory unit that stores therein the check image.

According to a fourteenth aspect of the present invention, in the money handling apparatus according to the thirteenth aspect, the control unit generates a composite image, in which the check amount is composited, at a predetermined position on the check image, and the memory unit stores therein the composite image.

According to a fifteenth aspect of the present invention, a money handling apparatus that handles money includes an inlet for taking in money; a money storing unit that stores therein the money; an outlet for dispensing the money; a money transport unit that transports the money between the inlet and the money storing unit, and the money storing unit and the outlet; a recognition unit that recognizes the money while the money is transported by the money transport unit; a check receiving port for receiving a check; a scanner that scans the check to acquire a check image; a check transport unit that transports the check between the check receiving port and the scanner; an operation unit for inputting data including a check amount; and a control unit that dispenses money equivalent to a difference amount between a transaction amount acquired from outside the money handling apparatus and a sum of the check amount and the deposited money.

According to a sixteenth aspect of the present invention, the money handling apparatus according to the fifteenth aspect further includes a printer that prints the check amount at a predetermined position on the check.

According to a seventeenth aspect of the present invention, in the money handling apparatus according to the sixteenth aspect, the printer prints the signature input via the operation unit at a predetermined position on the check.

According to an eighteenth aspect of the present invention, in the money handling apparatus according to the fifteenth aspect, the control unit outputs to an external device data including at least any of the check image acquired by the scanner and the check amount.

According to a nineteenth aspect of the present invention, the money handling apparatus according to the fifteenth aspect further includes a display that displays the check image.

According to a twentieth aspect of the present invention, in the money handling apparatus according to the nineteenth aspect, the display displays the check image, and overlay-displays the check amount at a predetermined position on the check image.

According to a twenty-first aspect of the present invention, the money handling apparatus according to the fifteenth aspect further includes a memory unit that stores therein the check image.

According to a twenty-second aspect of the present invention, in the money handling apparatus according to the twenty-first aspect, the control unit generates a composite image, in which the check amount is composited, at a predetermined position on the check image, and the memory unit stores therein the composite image.

Advantages of the Invention

According to a first aspect of the present invention, in a money handling apparatus not only an amount of deposited money, but also a received check amount is taken into account when judging a deposit amount, and change corresponding to a difference amount between the deposit amount and a transaction amount is dispensed. Therefore, the money handling apparatus can be used as an accounting support device that supports payments by check as well as by cash. Because the money handling apparatus includes a scanner, a check image is acquired and processes can be performed based on the acquired check image.

According to a second or an eighteenth aspect of the present invention, the check image acquired by the scanner is outputted to external devices, such as, a cash register and a server connected to the money handling apparatus. The acquired check image can be displayed and processes relating to check transactions are performed on these external devices.

According to a third or a fourth aspect of the present invention, after the check image is acquired by the scanner, the check image is used in subsequent processes relating to the check. Consequently, after completion of the transaction, the actual check can be returned to a customer.

According to a fifth aspect of the present invention, the actual check after acquisition of the check image can be stored in a storing unit instead of being returned to a customer, at the request of a user of the money handling apparatus.

According to a sixth, a thirteenth or a twenty first aspect of the present invention, the check image is stored and used in a subsequent process, such as, encashment of the check.

According to a seventh or an eighth aspect of the present invention, by judging the validity of the check, appropriate actions can be taken based on a judgment result. An invalid check, such as, a check drawn by an imposter, can be rejected or collected.

According to a ninth aspect of the present invention, a check amount that renders change dispensing unnecessary is automatically calculated from the amount of deposited money and the transaction amount. By entering the calculated check amount on the check and performing the transaction, the user can perform a transaction in which no dispensing of change is required, without having to perform any calculation himself/herself. The check image acquired by the scanner is used in the subsequent process, such as, encashment of the check.

According to a tenth or a nineteenth aspect of the present invention, the user can confirm the check amount on a display.

According to an eleventh or a twentieth aspect of the present invention, from the image displayed on the display, the user can confirm the check image to be used in transactions and a quality of the check image.

According to a twelfth or a sixteenth aspect of the present invention, the user can prepare a check with an appropriate check amount entered thereon without having to write the check amount himself/herself.

According to a fourteenth or a twenty second aspect of the present invention, information relating to the check amount can be stored in a memory unit even when the check on which the check amount is not entered is received from the customer.

According to a fifteenth aspect of the present invention, even when the check on which the check amount is not entered is received from the customer, an inputted value data is used as the check amount, and a deposit amount is judged according to the inputted check amount and the received amount of money. When there is an amount of difference between the deposit amount and the transaction amount, the change is dispensed. The check image acquired by the scanner is used for performing the subsequent process, such as, encashment of the check.

According to a seventeenth aspect of the present invention, a signature is automatically printed on the check simply by input of the signature data by the user.

An object, features, aspects, and advantages of the present invention will be more apparent from the detailed explanation given below and the accompanying drawings.

BRIEF DESCRIPTION OF DRAWINGS

FIG. 2 is a flowchart of main processing stages according to the embodiment of the present invention.

FIG. 3 is a flowchart of the main processing stages according to the embodiment of the present invention.

BEST MODE(S) FOR CARRYING OUT THE INVENTION

Figure 1:
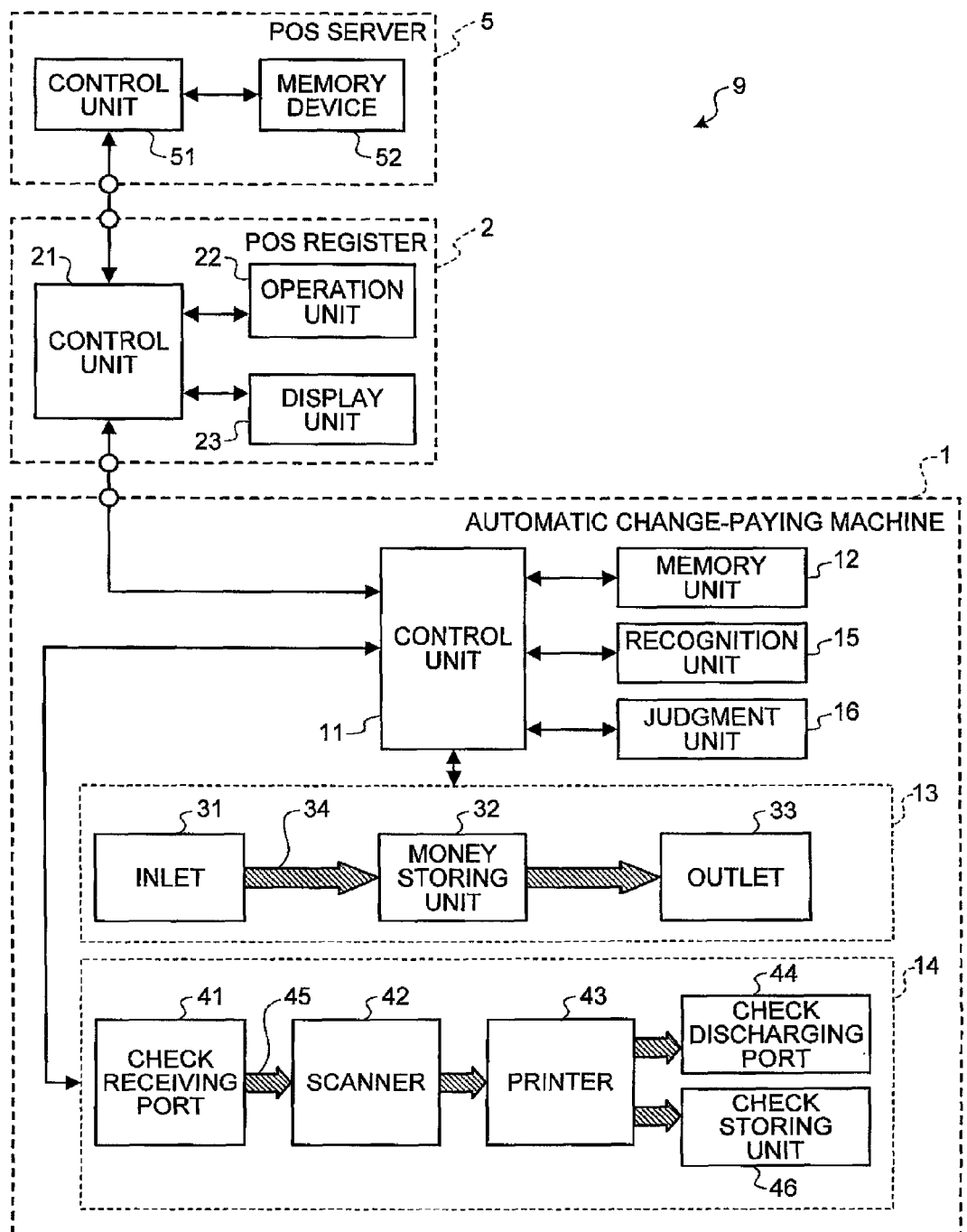
FIG. 1 is a block diagram of a change dispensing system according to an embodiment of the present invention.

Exemplary embodiments of the present invention are explained in detail below with reference to the accompanying drawings. The embodiments described below are examples in all aspects. The application or usage of the present invention is not intended to be limited only to these embodiments. Numerous modifications that are not exemplified in the present invention can be made without departing from the scope of the present invention.

FIG. 1 is a block diagram of a change dispensing system according to an embodiment of the present invention. As shown in FIG. 1, a change dispensing system 9 includes an automatic change dispenser 1, a POS register 2 connected to the automatic change dispenser 1, a POS server 5 connected to the POS register 2, etc.

A money handling apparatus according to the present invention can be realized with only the automatic change dispenser 1. Alternatively, the money handling apparatus can be realized with a plurality of devices, such as, the automatic change dispenser 1 and the POS register 2.

Functions and operations of the money handling apparatus, which includes the automatic change dispenser 1, according to the present invention are explained in detail below.

The automatic change dispenser 1 includes a memory unit 12, a money handling unit 13, a check handling unit 14, a recognition unit 15, a judgment unit 16, and a control unit 11 that is connected to each of the units described above.

The control unit 11 includes, for example, a CPU, etc., and has a function of controlling each of the unit included in the automatic change dispenser 1 and executing various processes described later. The control unit 11 also has a communication function of transmitting and receiving data required for the various processes between the automatic change dispenser 1 and the POS register 2.

The memory unit 12 is used for storing computer program codes, data, etc., required for the execution of the various processes by the control unit 11. The memory unit 12 can be realized by, for example, a volatile memory or a non-volatile memory or a hard disk, an optical disk, etc., according to the intended use of the stored information. The memory unit 12 can be fixed or detachable.

The money handling unit 13 includes an inlet 31, a money storing unit 32, an outlet 33, and a money transport unit 34, etc. The money transport unit 34 transports the money between the inlet 31, the money storing unit 32, and the outlet 33, etc. The money handling unit 13 realizes money depositing and dispensing process on the automatic change dispenser 1. That is, the money received from the customer is deposited into the automatic change dispenser 1 and the change to be returned to the customer is dispensed from the automatic change dispenser 1. The money handled by the money handling unit 13 can be banknotes, coins, or a combination of both.

The inlet 31 is for inserting the money to be deposited into the automatic change dispenser 1. The automatic change dispenser 1 receives the money inserted by the customer in the inlet 31. A sensor is arranged in the inlet 31 for detecting that the money has been inserted. The information on the detection result by the sensor is transmitted to the control unit 11. Thus, it can be detected that the money has been inserted into the inlet 31 and processing thereof can be started automatically.

The money storing unit 32 includes a plurality of storing units that store therein money. The money inserted from the inlet 31 is transported to and stored denomination-wise in the money storing unit 32. The money storing unit 32 has a function of dispensing the internally stored money by feeding out the banknotes or the coins one by one.

The outlet 33 is for discharging money from the automatic change dispenser 1. The automatic change dispenser 1 can return the change to the customer by discharging the money, which is fed from the money storing unit 32, from the outlet 33.

The money transport unit 34 has a function of transporting the money between the money storing unit 32 and the inlet 31, and the money storing unit 32 and the outlet 33. Specifically, the money transport unit 34 transports the money inserted by the customer in the inlet 31 to the money storing unit 32.

Furthermore, the money transport unit 34 transports the money from the money storing unit 32 to the outlet 33. Specifically, the money transport unit 34 transports the money equivalent to an amount to be dispensed from the discharge port 33 based on information received from the control unit 11.

A recognition unit included in the money handling unit 13 can perform recognition of the denomination and authenticity of the money transported by the money transport unit 34. Recognized denomination information is transmitted to the control unit 11. Consequently, the control unit 11 can calculate an amount of the money inserted from the inlet 31 or an amount of the money dispensed from the money storing unit 32.

The present invention is not limited to an aspect in which recognition of the money is performed in the money handling unit 13. For example, a cashier who operates the POS register 2 described later can perform visual confirmation of the money received from the customer, calculate the total amount thereof, and manually input the total amount from an operation unit 22 into the POS register 2. The money received from the customer can be stored in the money storing unit 32 of the money handling unit 13 or in a money storing unit of the POS register 2. The control unit 11 can receive the total amount manually inputted by the cashier and use it in subsequent processes.

When the money is stored in the money storing unit 32 after an amount of the stored money is manually inputted by the cashier, the money handling unit 13 can perform recognition of the stored money. When, based on the recognized amount, there is a possibility that an incorrect amount was manually inputted, the money is dispensed without storing it, and the cashier can recheck the amount of the dispensed money and input it again.

The money dispensed from the money storing unit 32 can be dispensed without performing money recognition in the money handling unit 13. For example, when the money of each of the denominations is stored in a predetermined storing unit from among the storing units constituting the money storing unit 32, only a required number of money of the required denomination can be fed from the predetermined storing unit that stores therein the money of the required denomination. The fed out money can be dispensed without performing recognition of the money.

It is possible to have a configuration in which the user can perform settings as to whether to use the recognition unit. It is desirable to use the recognition unit of the money handling unit 13 to accurately perform money depositing and dispensing. For example, the user may opt not to use the recognition unit when the speed of money depositing and dispensing is important for the user. If it is can be set as to whether to perform recognition of the money in the money handling unit 13, the money handling unit 13 can be operated in accordance with an operation method desired by the user.

A function of the recognition unit that recognizes the money can be realized by the recognition unit 15 that is described later. Specifically, signals detected by, for example, various sensors from recognition target money can be processed by the recognition unit 15 and the recognition of the money can be performed. Because the conventional technology can be used for money recognition, detailed description thereof is omitted.

The check handling unit 14 includes a check receiving port 41, a scanner 42, a printer 43, a check discharging port 44, and a check transport unit 45 that transports a check between each of the units. The check handling unit 14 realizes processes related to checks in the automatic change dispenser 1. The check handling unit 14 can further include a check storing unit 46.

The check receiving port 41 is for receiving the check to be deposited into the automatic change dispenser 1. The automatic change dispenser 1 receives the check inserted by the customer in the check receiving port 41. The check receiving port 41 includes a sensor for detecting that a check has been inserted in the check receiving port 41. The information on the detection result by the sensor is transmitted to the control unit 11. Subsequent process can be automatically started upon detection of insertion of a check in the check receiving port 41.

The scanner 42 acquires an image of the check, which was transported to the scanner 42, and transmits the acquired check image to the control unit 11. The user of the automatic change dispenser 1 can realize various processes in which the check image is used.

The printer 43 has a function of printing numbers, characters, a signature, etc., at predetermined positions of the check which was transported to the printer 43.

The check discharge port 44 is for discharging the check from the automatic change dispenser 1. The automatic change dispenser 1 can return a check to the customer by discharging it from the check discharge port 44.

The check transport unit 45 has a function of transporting the check between the check receiving port 41, the scanner 42, the printer 43, and the check discharge port 44. Specifically, the check received from the customer is transported from the check receiving port 41 to the check discharge port 44 via the scanner 42 and the printer 43.

In a configuration where the check handling unit 14 includes the check storing unit 46, the check deposited by the customer is stored in the check storing unit 46.

By enabling the user to select whether to include the check storing unit 46 and further perform settings related to conditions for returning the actual check to the customer, the automatic change dispenser 1 can be used according to the intended use. Specifically, for example, when the check storing unit 46 is included in the automatic change dispenser 1, the user can set a setting whereby only the check having an amount greater than or equal to a predetermined amount is stored in the check storing unit 46.

In the present embodiment, the money transport unit 34 of the money handling unit 13 and the check transport unit 45 of the check handling unit 14 are separate members. That is, a money transport path and a check transport path in the automatic change dispenser 1 are separate paths and processes related to the money and the check can proceed concurrently.

The above described functions and operations relating to the money handling unit 13 and the check handling unit 14 are realized by the control exerted on each unit by the control unit 11. Meanwhile, the inlet 31 and the outlet 33 of the money handling unit 13 can be arranged separately or can be combined. The same holds true for the check receiving port 41 and the check discharge port 44.

The recognition unit 15 has a function in which, for example, an OCR (Optical Character Recognition) method or an MICR (Magnetic Ink Character Recognition) method, is used to recognize the entire check image or a part of the check image acquired by the scanner 42. The recognition unit 15 transmits a recognition result to the control unit 11 whereupon the control unit 11 recognizes a type or a form of the check, positions of an amount area, a signature area, a date area, etc., on the check, and information relating to an amount, a signature, a date, etc., entered on the check. The recognition unit 15 includes various sensors such as an infrared light sensor, an ultraviolet light sensor that detects optical features, etc., a sensor that detects magnetic features, and a sensor that detects physical features such as a thickness and a size. The sensors acquire required data according to contents of the process executed by the judgment unit 16.

The judgment unit 16 judges whether the check is usable, that is, whether the check is valid based on the various information obtained by the recognition unit 15. Specifically, the judgment unit 16 judges whether the check is valid by comparing features, such as, a number, MICR, and a paper quality of the check with reference data that indicates features of the genuine check. Thus, counterfeit checks that cannot be encashed can be prevented from being accepted.

If the check bears a signature, the judgment unit 16 verifies whether the signature recognized by the recognition unit 15 matches with the actual drawer's signature. Specifically, the judgment unit 16 verifies the signature made on the check and a reference data that represents the signature made by the drawer of the check in the past. Thus, it can be judged whether the customer requesting the payment by check is a valid drawer of the check, and unauthorized transactions can be prevented.

For judging the validity of the check and verifying the signature, the judgment unit 16 can use the reference data that is stored previously in the memory unit 12 of the automatic change dispenser 1. The reference data can be acquired from the POS register 2 or the POS server 5. The reference data also can be acquired from a predetermined establishment, such as, a financial institution via the POS register 2 or the POS server 5. For example, the judgment unit 16 can have a function in which the validity of the check is confirmed based on the information relating to the financial institution, an account number, etc., recognized from the check. The information can be acquired from an external server, etc., of the financial institution.

Instead of the configuration where the money recognition unit, the recognition unit 15, and the judgment unit 16 are separate units, a configuration where one functional unit has more than one function, or a configuration where all the functions are realized by the control unit 11 is possible.

A structure, functions, and operations of the POS register 2 are explained below.

The POS register 2 includes the operation unit 22, a display unit 23, and a register-side control unit 21 connected to the operation unit 22 and the display unit 23. Furthermore, the POS register 2 includes a not shown memory unit that is used to store computer program codes, data, etc., for the execution of various processes.

The register-side control unit 21 executes various processes to be executed in the POS register 2. The register-side control unit 21 calculates a transaction amount, such as a sum of the prices of the items purchased by a customer, to be paid for the transaction by a customer. The register-side control unit 21 is capable of transmitting various information to and receiving various information from the control unit 11 of the automatic change dispenser 1 and a server-side control unit 51 of the POS server 5. The information includes the transaction amount or data related to details inputted via the later-described operation unit 22.

The operation unit 22 transmits information inputted by the cashier, the customer, etc., to the register-side control unit 21. The operation unit 22 includes, for example, a keyboard that includes a plurality of buttons, a barcode reader, a touch screen, etc. Thus, the POS register 2 can execute processes based on the inputted information.

The operation unit 22 can include a handwriting input device, for example, an electronic pad. The POS register 2 uses the handwriting input device to convert information, such as, characters handwritten by a predetermined pen, into electronic data. Thus, the POS register 2 can convert the signature of the customer into electronic data, and use the electronic data.

The display unit 23 includes, for example, a liquid crystal display, and has a function of displaying various information, such as, images and characters. Display contents on the display unit 23 are visible to both the cashier and the customer.

A structure, functions, and operations of the POS server 5 are explained below.

The POS server 5 includes a memory device 52 and the server-side control unit 51 connected to the memory device 52.

The server-side control unit 51 executes various processes executed in the POS server 5. The server-side control unit 51 is capable of transmitting various information to and receiving various information from the register-side control unit 21 of the POS register 2.

The memory device 52 is used to store computer program codes, data, etc., for the execution of various processes by the server-side control unit 51. The memory device 52 can be realized by, for example, a volatile memory or a non-volatile memory, or a hard disk, an optical disk, etc., according to the intended use of various stored information. The memory device 52 can be fixed or detachable. The POS server 5 is thus capable of storing therein information transmitted from the POS register 2.

The change dispensing system 9 operates as an accounting support device that supports payments by cash and by check according to the structure, and the functions and the operations of each of the units described above. The change dispensing system 9 is installed at, for example, retail stores, and operated by the cashier who handles payment processes.

Main processing stages executed by the change dispensing system 9 are explained with reference to flowcharts shown in FIGS. 2 and 3 by presenting the payment processes performed by the cashier of the retail store for the customer as an example.

In the POS register 2, the amount of items purchased by the customer is first affirmed as a transaction amount. Specifically, when the cashier starts entering the price of each of the items purchased by the customer via the operation unit 22, the register-side control unit 21 performs addition of the prices entered. Information relating to the price of items, the total amount, etc., is outputted from the register-side control unit 21 and displayed on the display unit 23. Upon completion of entry of the prices of the items, the total amount of all the items is affirmed as the transaction amount (Yes at Step S1). Transaction information that includes the affirmed transaction amount is transmitted from the register-side control unit 21 to the control unit 11.

Based on the transaction information received from the POS register 2, various processes relating to the cash and the check are commenced in the automatic change dispenser 1.

The control unit 11 monitors whether the money is inserted into the inlet 31 (Step S2), whether the check is inserted into the check receiving port 41 (Step S3), and whether the deposit amount is greater than or equal to the transaction amount (Step S4).

Upon detecting that the money received by the cashier from customer has been inserted in the inlet 31 (Yes at Step S2), the control unit 11 causes the money transport unit 34 to transport the money to the money storing unit 32 for storing therein. The control unit 11 recognizes the money and adds up the amount as a deposit amount received by the cashier from the customer (Step S5). Thereafter, the control proceeds to a process at Step S4.

When performing a process relating to the money received from the customer, for example, the cashier can visually confirm the money received from the customer without performing recognition in the automatic change dispenser 1 as described above, and calculate the total amount thereof. The cashier manually inputs the calculated amount via the operation unit 22 in the POS register 2 to input the amount into the automatic change dispenser 1. In this case, the control unit 11 executes processes such as receiving the total amount that is manually inputted by the cashier, recognizing that the money is received from the customer, and adding the total amount of money to the deposit amount (Steps S2 to S5).

The money received from the customer can be stored in the money storing unit 32 in the money handling unit 13 or inside the POS register 2.

Upon detecting that the check that the cashier has received from the customer is inserted into the check receiving port 41 (Yes at Step S3), the control unit 11 causes the check transport unit 45 to transport the check toward the scanner 42.

When the cash or the check is inserted, a subsequent process or an operation to be executed by the cashier or the customer is displayed on the display unit 23 in the POS register 2 by the control unit 11 and the register-side control unit 21. Thus, because the cashier can perform operations by following the guide information, occurrence of erroneous handling can be prevented.

Because the money transport unit 34 and the check transport unit 45 are separate units, processes relating to the money and the check proceed concurrently. Due to this, the total processing time can be shortened and the payment processes can be made to proceed rapidly.

The inserted check is transported to the scanner 42, and the scanner 42 acquires a check image of the check and outputs the check image to the control unit 11. The control unit 11 stores the check image into the memory unit 12 and transmits the check image to the register-side control unit 21. In the POS register 2, the register-side control unit 21 displays the check image on the display unit 23 (Step S11 of FIG. 3).

The cashier confirms the check image displayed on the display unit 23, and upon detecting a problem, such as, blurred image or a partially missing image, the cashier operates the operation unit 22 and issues an instruction to acquire a check image again (Yes at Step S12). This instruction is transmitted to the control unit 11 via the register-side control unit 21 and the process executed at Step S11 described above is re-executed. The process for acquiring the check image again can be executed automatically in the check handling unit 14 or, for example, the check can be once discharged from the check deposit port 41 or the check discharge port 44, to be inserted again by the cashier. If the reacquired new check image is satisfactory, the new check image is used in subsequent processes.

Thus, in the change dispensing system 9, the cashier visually confirms the check image, and if any problem is detected in the check image, an operation of acquiring the check image is repeated until a satisfactory check image is obtained. Due to this, the satisfactory check image can be stored in the memory unit 12 and used in the subsequent processes. That is, when performing the subsequent process, such as, encashment of the check, a problem such as inability to recognize necessary information from the check image can be prevented from occurring.

If the acquiring the check image is not required to be performed again (No at Step S12), the POS register 2 monitors whether the characters, etc., to be printed on the check are inputted (Step S13), and whether the check amount is inputted (Step S14).

In the present embodiment, the check amount is an amount paid by the customer by check, and is to be inputted into the amount area of the check when the transaction is completed.

If the characters, etc., to be printed on the check are inputted via the operation unit 22 (Yes at Step S13), the register-side control unit 21 overlay-displays the characters, etc., inputted via the operation unit 22 on the check image already displayed on the display unit 23 (Step S15). Specifically, when the check amount to be printed on the check is inputted via the operation unit 22, the register-side control unit 21 overlay-displays the input check amount in the amount area on the check image. Similarly, when the signature to be printed on the check is inputted, the register-side control unit 21 overlay-displays the inputted signature in the signature area on the check image.

On the check image, date is overlay-displayed in the date area where a transaction date to be used on the check is entered. The automatic change dispenser 1 or the POS register 2 internally maintains information relating to date and time for recording the transaction, issuing a receipt, etc. Therefore, the date information internally maintained by the automatic change dispenser 1 or the POS register 2 is automatically overlay-displayed in the date area of the check image. The date information can include only the date or the date and the time.

Positions of the amount area and the signature area on the check can be automatically determined based on the recognition result of the check obtained by the recognition unit 15, or can be determined based on the operation performed by the cashier using the operation unit 22.

Specifically, a form of the check can be recognized from the features of the check, and position information, which is stored previously, of various areas corresponding to the form can be used. Alternatively, each area can be recognized from the features printed on the check, or the cashier can indicate the position of each area on the check image using a touch screen.

As a state of the check inserted into the check receiving port 41, the check can include the amount and the signature that were entered previously. Also there are cases where the check includes only the amount, or the check includes only the signature, or the check includes neither the amount nor the signature.

In the change dispensing system 9, the characters, etc., that are to be printed as the amount, the signature, etc., can be inputted. Therefore, the change dispensing system 9 can suitably handle the check even if the inserted check corresponds to any state described above. That is, the change dispensing system 9 recognizes whether the necessary information for encashment of the check is entered previously, prompts for the input of missing information via the operation unit 22, and overlay-displays the inputted contents on the check image so that the inputted contents can be confirmed on the display unit 23.

The check amount, etc., is overlay-displayed on the check image; however, in addition to that, the amount information, such as, the transaction amount and the check amount can be separately displayed on the display unit 23. It is desirable that an overlay display function be used so that the state of the actual check after completion of the transaction can be confirmed; however, instead of overlay-displaying the information relating to the check amount, etc., the information can be displayed separately from the check image.

The input of the check amount (Step S14) is performed automatically or manually. When the amount is inputted automatically, the control unit 11 calculates a difference between the transaction amount and the deposit amount deposited by cash. The calculated difference is regarded as the check amount.

In case of automatic input, because the amount that is just in proportion to the transaction amount is automatically set as the check amount, there is no need to input the amount. The check amount can be automatically set to an appropriate value, taking into account the deposit amount that is deposited by cash.

On the other hand, in case of manual input, the amount inputted via the operation unit 22 by the cashier or the customer is regarded as the check amount.

The cashier can select via the operation unit 22 whether the check amount is to be inputted automatically or manually, for example, when performing the payment processing by the POS register 2. Alternatively, settings can be made previously such that the check amount is always inputted automatically or manually.

The cashier or the customer can visually confirm the inputted check amount on the display unit 23. The check amount is inputted by using the operation unit 22. Therefore, problems such as inability to identify numbers due to, for example, input of the amount by the customer in a messy handwriting can be prevented from occurring. Accordingly, stability can be maintained in the subsequent process, such as, encashment.

Even if the check amount is already entered by the customer, the recognition unit 15 automatically recognizes the inputted check amount by a process, such as, OCR. Alternatively, the cashier determines the check amount by performing manual input. The determined amount is displayed on the display unit 23 as the inputted check amount. Therefore, even if the check amount is handwritten on the check, the amount can be displayed on the display unit 23 and confirmed. Therefore, ambiguities relating to the check amount can be prevented from occurring.

When the check amount is inputted (Yes at Step S14), the cashier is prompted to approve the transaction displayed on the display unit 23 (Step S16).

The display contents that are displayed on the display unit 23 are specifically the transaction amount, the deposited cash amount, the check amount, the deposit amount when the transaction is approved (sum of deposited cash amount and the check amount), amount information such as a change amount, and the check image. The information to be printed on the check after approval of the transaction, including the check amount, the signature, the transaction date, etc., is overlay-displayed on the check image.

Upon visual confirmation of the display contents on the display unit 23, the customer or the cashier operates the operation unit 22 to perform the approval operation.

If the approval is not given (No at Step S16), the control returns to the process at Step S13 again to enable corrections in the inputted contents. Alternatively, if the transaction itself is stopped or the usage of the check is stopped by the volition of the customer or if there are any problems in the validity of the check or in the verification result of the signature, the handling of the check is stopped, the check is discharged from the check receiving port 41 or the check discharge port 44, and returned to the customer.

If the approval is given (Yes at Step S16), the check amount is added to the deposit amount (Step S17).

After successful completion of the approval, the check is transported by the check transport unit 45 to the printer 43 and predetermined contents are printed on the check using the printer 43. Specifically, the contents overlay-displayed on the check image are printed on the actual check as visually confirmed by the customer or the cashier on the display device 23. That is, a check according to a confirmation made by the cashier or the customer on the display by using the overlay-display function is made out.

Even if the check amount is entered in handwriting by the customer previously, the subsequent process can be easily performed by printing the easily recognizable numbers on the check.

The information, such as, the check amount, the signature, and the transaction date are printed on the check as the information required for encashment of the check during the subsequent process. However, additionally, information indicating that the check is a cancelled check, a name of the retail store, the transaction date, a register number, a name of the cashier, etc., can be printed on the check. Such information can be printed on a front-face of the check or can be printed as an endorsement.

The check with the necessary printing performed thereon by the printer is discharged from the check discharge port 44 (Step S18). Thereafter, the control proceeds to the process at Step S4.

The deposit amount is added by processing of the cash (Step S5) and by processing of the check (Step S17) described above. If the deposit amount is greater than or equal to the transaction amount, the cashier performs the predetermined operation by using the operation unit 22 (Yes at Step S4), and as a result, the automatic change dispenser 1 dispenses the amount of difference between the deposit amount and the transaction amount (Step S6) as the change. That is, the sum of the amount paid by cash and the amount paid by check by the customer is regarded as the deposit amount, the purchase price of the items is regarded as the transaction amount, and the amount of difference is dispensed as the change whenever required.

When dispensing the change, the automatic change dispenser 1 can automatically judge that the deposit amount is greater than or equal to the transaction amount, and start to dispense the change without the cashier having to perform a manual operation.

When dispensing the change, the money of the required denomination is fed from the money storing unit 32, transported, and discharged from the outlet 33.

As described above, the change can be dispensed, for example, by performing money recognition in the money handling unit 13 or without performing money recognition. When money of each of the denominations is stored in a predetermined storing unit from among the storing units constituting the money storing unit 32, only a required number of pieces of money of the required denomination can be fed from the predetermined storing unit that stores therein the money of the required denomination and dispensed without performing recognition of the money.

The payment processes pertaining to the transaction are completed by the operations described above. Thereafter, the change dispensing system 9 returns to Step S1, ready to handle a new transaction.

If the deposit amount is less than the transaction amount (No at Step S4), the processes are once again sequentially executed from Step S2. The customer can thus further deposit the cash or the check and increase the deposit amount.

With the functions and the operations of the automatic change dispenser 1 described above, the customer or the cashier does not need to calculate himself/herself the amount of payments by cash or check.

Specifically, for example, the customer can pay a desired amount out of the transaction amount by cash and pay the remaining amount by check without having to calculate himself/herself. Conversely, the customer can pay a desired amount out of the transaction amount by check and pay the remaining amount by cash.

The cashier can simply confirm the display on the display unit 23, and request the customer for the additional payment by cash or check if the total amount is insufficient, without having to calculate himself/herself the sum of the cash and the check amount paid by the customer. If the total amount paid by the customer exceeds the transaction amount, the excess amount is automatically dispensed as the change, which the cashier can simply return to the customer.

If the transaction ends in a state in which the change does not need to be dispensed or in a state in which the change is dispensed (Step S6), various information relating to the transaction is stored in the memory unit 12. The stored information includes the check image, the transaction amount, the deposit amount that includes the cash and the check amount received from the customer, the transaction date, etc., as well as identification information by which the retail store, the POS register 2, and the cashier can be identified. Such information can be stored in the memory unit 12 in the automatic change dispenser 1, or, for example, output from the control unit 11 and stored in the POS register 2 or the memory device 52 in the POS server 5. When storing such information, a user can arbitrarily set contents of data to be stored and a storage location for the data.

Instead of storing the check image acquired by the scanner 42 as it is, a composite image obtained by compositing each item printed on the actual check with a check image acquired by the scanner can be stored. Alternatively, a check image, which is obtained by scanning the check again by the scanner 42 after the necessary information is printed on the check, can be stored.

An example of using the change dispensing system 9 is explained below more concretely. A case is assumed below in which the payment is made by a check without an amount and a signature on it, upon purchase of items equivalent to USD 1000 by the customer.

The cashier inputs the price of the items using, for example, a numerical keypad or a barcode reader as the operation unit 22 of the POS register 2, and the transaction amount of USD 1000 is affirmed (Step S1) and displayed on the display unit 23. The cashier confirms the display and requests the customer for the payment of USD 1000. The customer hands over the check to the cashier and when the cashier inserts the check into the check receiving port 41 (Yes at Step S3), the check image acquired by the scanner 42 is displayed on the display unit 23 (Step S11).

The cashier confirms the check image displayed on the display unit 23, and upon judging that the image is clear, inputs an instruction using the operation unit 22 indicating that scanning of the check image is not required again (No at Step S12). Upon confirming from the check image that the amount and the signature are not entered on the check, the cashier requests the customer to input the amount and the signature to be printed on the check.

The recognition unit 15 recognizes the check received from the customer and confirms the areas where the check amount and the signature are to be overlay-displayed or printed. The judgment unit 16 judges the validity of the check by comparing each feature portion of the check recognized by the recognition unit 15 with information previously stored in the memory unit 12. There are occasions when the check is judged to be invalid due to, for example, the check being a counterfeit check or a checking account of the check has insufficient balance even if the check itself is valid.

If, as a result, the check is judged to be invalid, a warning is displayed on the display unit 23, the check is discharged from the automatic change dispenser 1, and the cashier is prompted to return the check to the customer. The cashier takes an appropriate action based on the instructions.

To prevent the counterfeit check from being used again, depending on the settings made by the user of the automatic change dispenser 1, predetermined information can be printed on the check and returned. Alternatively, the counterfeit check can be collected in the check storing unit 46 without return to the customer. When the check is judged to be valid, the control shifts to a process for input of a next check amount.

In case of automatic input of the check amount, "USD 1000" is automatically input as the check amount. In case of manual input of the check amount, the customer inputs the numerical value "USD 1000" via the operation unit 22. Once the amount is inputted (Yes at Step S13), the inputted amount is overlay-displayed on the check image on the display unit 23 (Step S15).

In case of manual input of the check amount, other than the aspect wherein the customer inputs the check amount via the operation unit 22 while confirming the display on the display unit 23, an aspect wherein the cashier inputs the check amount on behalf of the customer to reduce the time and efforts of the customer is possible. Furthermore, the customer operates the operation unit 22 to input the signature as deemed necessary.

If the signature data related to the check that is being processed has been stored in the memory unit 12, etc., the judgment unit 16 verifies the signature data in the memory unit 12 and the signature made by the customer. If the comparison shows that the customer is not the actual drawer of the check, a warning is displayed on the display unit 23, the check is discharged from the automatic change dispenser 1, and the cashier is prompted to return the check to the customer. The cashier takes an appropriate action based on the instructions.

To prevent the check from being used again, depending on the settings made by the user of the automatic change dispenser 1, the check can be returned after printing predetermined information on the check. Alternatively, the counterfeit check can be collected in the check storing unit 46 without return to the customer. When the check is judged to be valid, the control shifts to the subsequent approval process.

At the present stage (Yes at Step S14), the amount information such as transaction amount of USD 1000, a deposit amount paid by cash of USD 0, and the change amount of USD 0, and the check image in which USD 1000, the signature, and the transaction date are, respectively, overlay-displayed in the amount area, the signature area, and the date area are displayed on the display unit 23. The cashier and the customer confirm that there are no problems in the contents displayed. Upon confirming that there are no problems, the customer, or the cashier, or both can input via the operation unit 22 an approval data used for the approval of the transactions of the contents displayed on the display unit 23 (Yes at Step S16).

The transaction is thus affirmed and the check amount is added to the deposit amount (Step S17). The check amount, the signature, etc., are printed on the check and the check is discharged from the check discharge port (Step S18). The cashier pulls out the discharged check and returns it to the customer. Information, from which it can be judged that the check is a used one, is printed on the check.

Upon addition of the check amount of USD 1000 to the deposit amount, the deposit amount reaches the transaction amount (Yes at Step S4). The change dispensing system 9 therefore regards the transaction as completed and returns to the process at Step S1. The check image of the check with the necessary information printed thereon is acquired again and stored in the memory unit 12. Alternatively, a check image is generated by compositing the check amount, the signature, and the transaction date, respectively, in the amount area, the signature area, and the date area in the initially acquired check image, and stored in the memory unit 12. The amount information including the transaction amount and the check amount and the recognition information including the retail store, the POS register, and the name of the cashier are stored in the memory unit 12.

Change is dispensed depending on the situation; however, in the present example, because the amount of difference between the deposit amount and the transaction amount is zero, no change is dispensed.

Thereafter, the retail store uses the check image and the various information stored in the memory unit 12 for encashment of the check amount from a bank, etc.

In the change dispensing system 9 described above, the check is discharged and returned to the customer. However, in a configuration where the check is stored in the check storing unit 46, a transaction counterfoil with various information, such as, the transaction amount and the check amount printed thereon, the printed check image, etc., can be returned to the customer instead of the check. If the actual check is stored in the storing unit, the actual check can be used in the subsequent process, such as, encashment of the check at the bank, etc., instead of the check image. In this case, also, the process of encashment can be easily and reliably executed because the various information relating to the check transaction is stored.

In the change dispensing system 9 described above, an aspect is cited in which the POS register 2 includes the operation unit 22 by which the user can perform various input operations and the display unit 23 that shows various displays. However, the present invention is not limited to the aspect cited above. For example, the operation unit 22 and the display unit 23 can be included in the automatic change dispenser 1, or a separate operation unit 22 and a display unit 23 can be arranged independent of the automatic change dispenser 1 and the POS register 2.

As explained above, in the automatic change dispenser 1 according to the present embodiment, the money handling unit 13 and the check handling unit 14 are independent of each other, and can be used as the accounting support devices that support payments both by cash and the check.

The automatic change dispenser 1 can dispense the change whenever required based on the amount paid by cash and the amount paid by check. Alternatively, the automatic change dispenser 1 can automatically set the check amount according to the deposited money so that the change does not need to be dispensed.

The automatic change dispenser 1 can store the check image acquired by the scanner 42 and the various information relating to the transactions in the memory unit 12.

Therefore, the automatic change dispenser 1 can execute the process rapidly and accurately while supporting the payments both by cash and the check. Furthermore, the automatic change dispenser 1 can dispense the change whenever required, and reliably acquire and store a high-quality check image required for encashment of the check.

INDUSTRIAL APPLICABILITY

The present invention is useful in areas, such as, a depositing machine, a dispensing machine, and a depositing and dispensing machine used for supporting accounting services.

EXPLANATIONS OF LETTERS OR NUMERALS

1: Automatic change dispenser
2: POS register
5: POS server
9: Change dispensing system
11: Control unit
12: Memory unit
13: Money handling unit
14: Check handling unit
15: Recognition unit
16: Judgment unit
21: Register-side control unit
22: Operation unit
23: Display unit
31: Inlet
32: Money storing unit
33: Outlet
34: Money transport unit
41: Check receiving port
42: Scanner
43: Printer
44: Check discharge port
45: Check transport unit
46: Check storing unit
51: Server-side control unit
52: Storage device

The invention claimed is:

1. A money handling apparatus including an automatic change dispenser and a POS register, comprising:
   an inlet for receiving money;
   a money storing unit that stores therein the money;
   a money transport unit that transports the money between the inlet and the money storing unit;
   a money recognition unit that recognizes money information including a denomination of the money transported by the money transport unit;
   a check receiving port for receiving a check;
   a scanner that scans the check to acquire a check image;
   a check transport unit that transports the check between the check receiving port and the scanner;

a check recognition unit that recognizes check information from the check image acquired by the scanner;
an operation unit that receives check information inputted manually; and
a control unit that selects the check information recognized by the check recognition unit or the check information received by the operation unit and performs a predetermined process by using selected check information and the money information even when the check information has been written on the check;
wherein the money information is information regarding an amount of the money received in the inlet, and the check information is information regarding an amount of the check received in the check receiving port,
as the predetermined process, the control unit acquires information regarding a transaction amount calculated by the POS register, calculates an amount of difference between the transaction amount and a sum of the amount of the check and the amount of the money, and dispenses money corresponding to the amount of difference from the money storing unit,
the inlet, the money storing unit, the money recognition unit, the check receiving port, the scanner, the check transport unit and the check recognition unit are provided in the automatic change dispenser, and
the operation unit is provided in the POS register.

2. The money handling apparatus according to claim 1, wherein when the check information has been recognized by the check recognition unit, the control unit performs the predetermined process by using recognized check information.

3. The money handling apparatus according to claim 1, wherein when the check information has been received by the operation unit, even if the check information written on the check is recognized by the check recognition unit, the control unit performs the predetermined process by selecting manually inputted check information.

4. The money handling apparatus according to claim 1, wherein the check information includes a signature, and reference data to verify the signature is acquired from the POS register.

5. The money handling apparatus according to claim 1, the POS register further includes a display unit that displays the check information received by the operation unit.

6. The money handling apparatus according to claim 5, wherein the check information received by the operation unit is overlay-displayed on the check image displayed on the display unit.

7. The money handling apparatus according to claim 1, wherein approval information to approve of performing the predetermined process is received by the operation unit.

8. The money handling apparatus according to claim 5, wherein information displayed on the display unit is visible to both a cashier and a customer.

9. The money handling apparatus according to claim 1, the automatic change dispenser further includes a printer that prints the check information received by the operation unit on the check received in the check receiving port.

10. A money handling apparatus including an automatic change dispenser and a POS register, comprising:
an inlet for receiving money;
a money storing unit that stores therein the money;
a money transport unit that transports the money between the inlet and the money storing unit;
a money recognition unit that recognizes money information including a denomination of the money transported by the money transport unit;
a check receiving port for receiving a check;
a scanner that scans the check to acquire a check image;
a check transport unit that transports the check between the check receiving port and the scanner;
a check recognition unit that recognizes check information from the check image acquired by the scanner;
an operation unit that receives check information inputted manually; and
a control unit that selects the check information recognized by the check recognition unit or the check information received by the operation unit and performs a predetermined process by using selected check information and the money information even when the check information has been written on the check;
wherein the money information is information regarding an amount of the money received in the inlet, and the check information is information regarding an amount of the check received in the check receiving port,
as the predetermined process, the control unit acquires information regarding a transaction amount calculated by the POS register, calculates an amount of difference between the transaction amount and a sum of the amount of the check and the amount of the money, and dispenses money corresponding to the amount of difference from the money storing unit,
the inlet, the money storing unit, the money recognition unit, the check receiving port, the scanner, the check transport unit and the check recognition unit are provided in the automatic change dispenser, and
the operation unit is provided independent of the automatic change dispenser and the POS register.

* * * * *